(12) United States Patent
Kuzuhara et al.

(10) Patent No.: US 10,086,841 B2
(45) Date of Patent: Oct. 2, 2018

(54) CONTROL APPARATUS FOR TRANSMISSION

(71) Applicant: Honda Motor Co., Ltd., Tokyo (JP)

(72) Inventors: Keiji Kuzuhara, Wako (JP); Keisuke Kawamura, Wako (JP); Takumi Kawano, Wako (JP); Yasuyuki Masaoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/494,406

(22) Filed: Apr. 21, 2017

(65) Prior Publication Data

US 2017/0305430 A1    Oct. 26, 2017

(30) Foreign Application Priority Data

Apr. 26, 2016   (JP) ................. 2016-087627

(51) Int. Cl.
| | | |
|---|---|---|
| *B60W 30/19* | (2012.01) | |
| *B60W 10/02* | (2006.01) | |
| *B60W 10/08* | (2006.01) | |
| *B60W 10/113* | (2012.01) | |
| *B60W 20/00* | (2016.01) | |
| *F16H 61/04* | (2006.01) | |

(52) U.S. Cl.
CPC ............ *B60W 30/19* (2013.01); *B60W 10/02* (2013.01); *B60W 10/08* (2013.01); *B60W 10/113* (2013.01); *B60W 20/00* (2013.01); *F16H 61/04* (2013.01); *B60W 2510/081* (2013.01); *B60Y 2200/92* (2013.01); *Y02T 10/7258* (2013.01); *Y10S 903/93* (2013.01)

(58) Field of Classification Search
CPC ...... B60W 30/19; B60W 10/02; B60W 10/08; B60W 10/113; B60W 20/00; B60W 2510/081; B60Y 2200/92; Y10S 903/93
USPC .......................................................... 701/22
See application file for complete search history.

(56) References Cited

U.S. PATENT DOCUMENTS

| | | | | |
|---|---|---|---|---|
| 9,102,226 B2* | 8/2015 | Makino | .................... | B60K 6/52 |
| 2014/0209426 A1 | 7/2014 | Mori et al. | | |
| 2015/0298576 A1* | 10/2015 | Kurita | ....................... | B60T 7/12 |
| | | | | 701/22 |

(Continued)

FOREIGN PATENT DOCUMENTS

| | | |
|---|---|---|
| JP | 10299884 A | 11/1998 |
| JP | 2013213537 A | 10/2013 |
| JP | 2014098452 A | 5/2014 |

(Continued)

*Primary Examiner* — Marthe Y Marc-Coleman
(74) *Attorney, Agent, or Firm* — Duft Bornsen & Fettig LLP

(57) ABSTRACT

A control apparatus for a transmission including a gear engagement commander outputting a gear engagement command of a sleeve, an actuator controller controlling an actuator to move the sleeve from a neutral position to a gear engaging position when the gear engagement command is output, a gear engagement determiner determining whether an engagement of the sleeve is prevented in a course of moving the sleeve from the neutral position to the gear engaging position; and a motor controlling an electric motor to rotate a rotating shaft so as to change a rotational position of movable dog teeth relative to passive dog teeth when it is determined that the engagement of the sleeve is prevented.

12 Claims, 8 Drawing Sheets

(56) References Cited

U.S. PATENT DOCUMENTS

2017/0058968 A1\* 3/2017 Black .................. F16D 25/061

FOREIGN PATENT DOCUMENTS

| JP | 2014149022 A | 8/2014 |
| --- | --- | --- |
| JP | 2014218136 A | 11/2014 |
| JP | 2015064080 A | 4/2015 |
| WO | 2013161698 A1 | 10/2013 |

\* cited by examiner

CONTROL APPARATUS FOR TRANSMISSION

CROSS-REFERENCE TO RELATED APPLICATION

This application is based upon and claims the benefit of priority from Japanese Patent Application No. 2016-087627 filed on Apr. 26, 2016, the content of which is incorporated herein by reference.

BACKGROUND OF THE INVENTION

Field of the Invention

This invention relates to a control apparatus for a transmission for controlling an engagement of dog teeth.

Description of the Related Art

Conventionally, an apparatus is known that includes a sleeve mounted to be axially movable on a hub that rotates integrally with a rotating shaft of a transmission and a gear arranged beside the sleeve to be rotatable relative to the rotating shaft, and that, when an engagement of dog teeth provided on the sleeve with dog teeth provided on the gear fails, reattempt the engagement of the dog teeth with each other. The apparatus described in Japanese Unexamined Patent Publication NO. 10-29984 (JPH10-29984A), for example, when sleeve movement for engaging the dog teeth is instructed but the sleeve nevertheless does not move to a desired position, the sleeve is once returned to a pre-movement neutral position and the engagement of the dog teeth with each other is reattempted a predetermined time later.

However, in the apparatus described in JPH10-29984A, since the sleeve is returned to the neutral position to reattempt the engagement when the engagement fails, it takes time to complete the engagement and shift operations are hard to perform rapidly.

SUMMARY OF THE INVENTION

An aspect of the present invention is a control apparatus for a transmission, and the transmission includes a rotating shaft rotatable by an electric motor; a hub configured to rotate integrally with the rotating shaft; a sleeve including movable dog teeth and supported on the hub through the movable dog teeth in a manner movable in an axial direction; a rotor arranged beside the sleeve in the axial direction in a manner rotatable relative to the rotating shaft and including passive dog teeth engageable with the movable dog teeth; and an actuator configured to move the sleeve from a neutral position where the movable dog teeth is apart from the passive dog teeth so that the rotor is rotatable relative to the rotating shaft to a gear engaging position where the movable dog teeth engage with the passive dog teeth so that the rotor is rotatable integrally with the rotating shaft to establish a predetermined speed stage. The control apparatus includes a processor configured to perform: outputting a gear engagement command of the sleeve; controlling the actuator to move the sleeve from the neutral position to the gear engaging position when the gear engagement command is output; determining whether an engagement of the sleeve is prevented in a course of moving the sleeve from the neutral position to the gear engaging position by the actuator; and controlling the electric motor to rotate the rotating shaft so as to change a rotational position of the movable dog teeth relative to the passive dog teeth when it is determined that the engagement of the sleeve is prevented.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
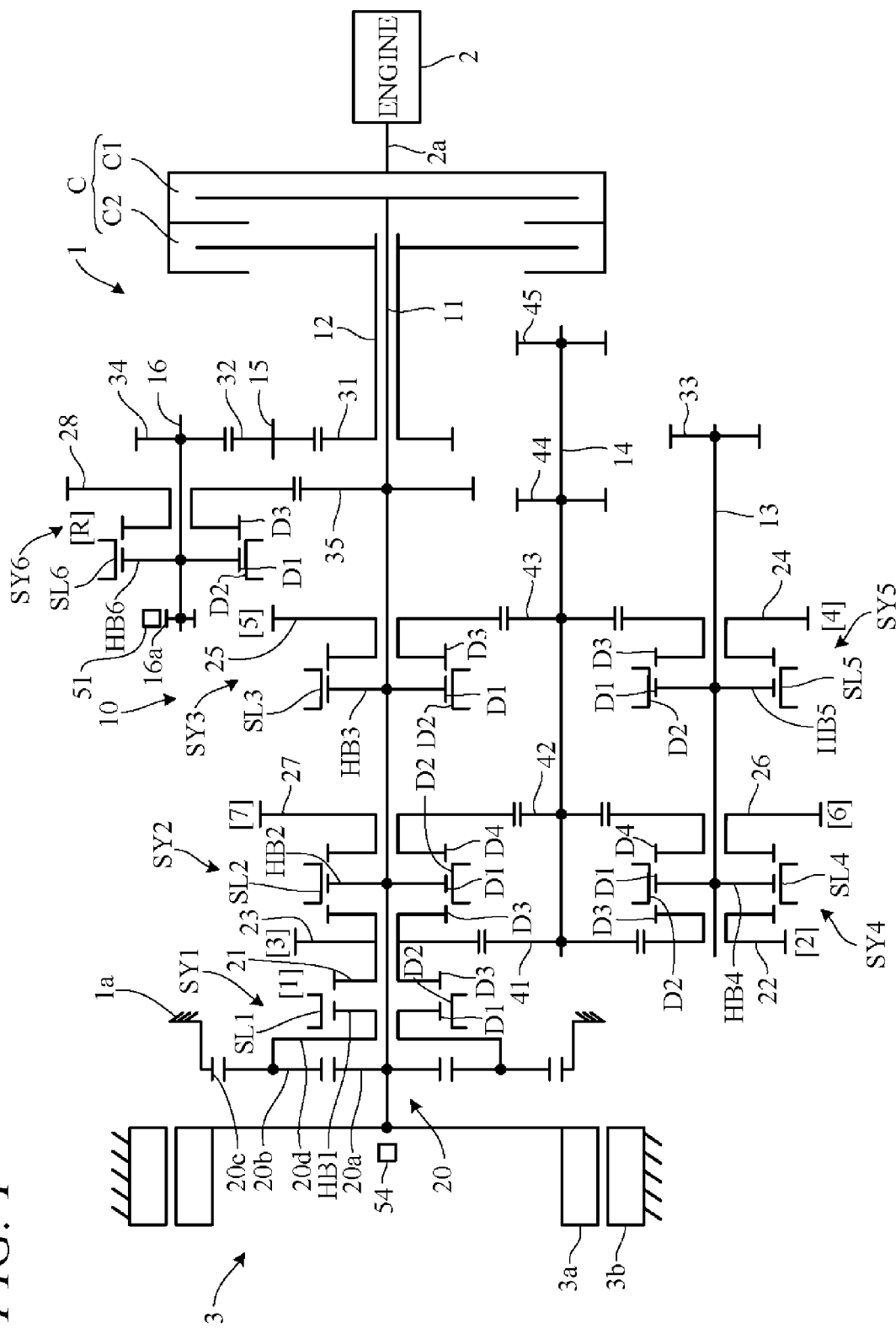
FIG. 1 is a diagram showing schematically part of a configuration of a transmission to which a control apparatus according to an embodiment of the present invention is applied.

Hereinafter, an embodiment of the present invention is explained with reference to FIGS. 1 to 7. FIG. 1 is a diagram schematically showing part of a configuration of a transmission to which a control apparatus according to an embodiment of the present invention is applied. This transmission is mounted on a hybrid vehicle, for example. The hybrid vehicle includes an engine 2 and an electric motor 3.

The transmission 1 includes a gear mechanism 10 for changing rotational speed of at least one of the engine 2 and the electric motor 3 at speed ratios in accordance with speed stages and a clutch mechanism C for transmitting or not transmitting torque of the engine 2 to the gear mechanism 10. Torque output through the gear mechanism 10 is transmitted to drive wheels through a differential gear mechanism, a drive shaft and the like (none of which are shown), thus driving the vehicle. Alternatively, torque of the engine 2 acting as a prime mover can be output to the transmission 1 through a torque converter.

The gear mechanism 10 includes multiple rotatably supported rotating shafts arranged substantially in parallel with one another, i.e., a first main input shaft 11, a second main input shaft 12, an auxiliary input shaft 13, an output shaft 14, an idler shaft 15, and a reverse shaft 16. The second main input shaft 12 is formed hollow so as to concentrically enclose the first main input shaft 11. The transmission 1 is, for example, an automatic transmission with seven forward speeds and one reverse speed. The clutch mechanism C is, for example, constituted as a dry dual clutch including a first clutch C1 and a second clutch C2.

The electric motor 3 is, for example, constituted as a three-phase DC brushless motor having a rotor 3a rotatably supported inside a housing (not shown) of the electric motor 3 and a stator 3b fixed on the housing to surround the rotor 3a. One end of the first main input shaft 11 is connected to the rotor 3a of the electric motor 3, and the first main input shaft 11 can rotate integrally with the rotor 3a. The stator 3b includes a coil wound around a stator core, and the coil is electrically connected through a power drive unit to a battery. Operation of the power drive unit is controlled by a controller (FIG. 5A) serving as an electronic control unit (ECU). This enables torque produced by the electric motor 3 to be controlled and the controlled torque of the electric motor 3 to be input to the first main input shaft 11. During vehicle braking, regenerated energy can be input to the electric motor 3.

The other end of the first main input shaft 11 is connected through the first clutch C1 to an output shaft 2a of the engine 2, and the first main input shaft 11 and output shaft 2a are connected or disconnected in accordance with engagement or disengagement of the first clutch C1. More specifically, when the first clutch C1 engages, the first main input shaft 11 and output shaft 2a are connected and torque from the engine 2 is input to the first main input shaft 11. On the other hand, when the first clutch C1 disengages, the first main input shaft 11 and output shaft 2a are disconnected and input of torque from the engine 2 is cut off.

The first clutch C1 is a clutch for odd-numbered speed stages, and a first speed drive gear 21, a third speed drive gear 23, a seventh speed drive gear 27 and a fifth speed drive gear 25 are arranged on the first main input shaft 11 in this order from the electric motor 3 side. In other words, the first main input shaft 11 is a rotating shaft for odd-numbered speed stages. The drive gears 21, 23, 25 and 27 are supported on the outer peripheral surface of the first main input shaft 11 through associated bearings so as to be rotatable relative to the first main input shaft 11. The first speed drive gear 21 and the third speed drive gear 23 are provided to be integrally rotatable.

A planetary gear unit 20 is disposed between the rotor 3a of the electric motor 3 and the first speed drive gear 21. The planetary gear unit 20 includes a sun gear 20a fixed on the first main input shaft 11, a ring gear 20c installed around the sun gear 20a, a planetary gear 20b disposed between the sun gear 20a and the ring gear 20c and meshed with the sun gear 20a and the ring gear 20c, and a carrier 20d which rotatably supports the planetary gear 20b. The sun gear 20a and the carrier 20d are both mounted to be rotatable around the first main input shaft 11, and the ring gear 20c is fixed to a casing 1a of the transmission 1. Therefore, rotation of the sun gear 20a rotates the carrier 20d at a rotational speed proportional to the rotational speed of the sun gear 20a.

In the present specification, when it is stated that a gear is fixed on a rotating shaft 11 to 16, this is meant to include a case in which the gear is machined on an outer peripheral surface of a rotating shaft 11 to 16 and a case in which a gear separate from a rotating shaft 11 to 16 is supported on the rotating shaft 11 to 16 by spline coupling or the like, i.e., cases in which a gear is provided on a rotating shaft 11 to 16 to be incapable of relative rotation.

One end of the second main input shaft 12 is connected through the second clutch C2 to the output shaft 2a of the engine 2, and the second main input shaft 12 and output shaft 2a are connected or disconnected in accordance with engagement or disengagement of the second clutch C2. More specifically, when the second clutch C2 engages, the second main input shaft 12 and output shaft 2a are connected and torque from the engine 2 is input to the second main input shaft 12. On the other hand, when the second clutch C2 disengages, the second main input shaft 12 and output shaft 2a are disconnected and input of torque from the engine 2 is cut off.

A gear 31 is fixed on the other end of the second main input shaft 12. The gear 31 meshes with an idler gear 32 fixed on the idler shaft 15, and the idler gear 32 meshes with a gear 33 fixed on the auxiliary input shaft 13. Torque of the second main input shaft 12 is therefore transmitted through the idler gear 32 to the auxiliary input shaft 13, whereby the auxiliary input shaft 13 rotates together with the second main input shaft 12.

The second clutch C2 is a clutch for even-numbered speed stages, and a second speed drive gear 22, a sixth speed drive gear 26 and a fourth speed drive gear 24 are arranged on the auxiliary input shaft 13 in this order from the electric motor 3 side. In other words, the auxiliary input shaft 13 is a rotating shaft for even-numbered speed stages. The drive gears 22, 24 and 26 are supported on the outer peripheral surface of the auxiliary input shaft 13 through associated bearings so as to be rotatable relative to the auxiliary input shaft 13.

A gear 34 is fixed on one end of the reverse shaft 16. The gear 34 meshes with the idler gear 32, whereby torque of the second main input shaft 12 is input to the reverse shaft 16. A reverse drive gear 28 is supported on the outer peripheral surface of the reverse shaft 16 through a bearing so as to be rotatable relative to the reverse shaft 16. The reverse drive gear 28 meshes with a reverse driven gear 35 fixed on the first main input shaft 11 between the fifth speed drive gear 25 and the gear 31.

A second-third speed driven gear 41, a sixth-seventh speed driven gear 42, a fourth-fifth speed driven gear 43, a parking gear 44 and a final gear 45 are fixed on the output shaft 14 in this order from the electric motor 3 side. The second-third speed driven gear 41 meshes with the second speed drive gear 22 and the third speed drive gear 23. The sixth-seventh speed driven gear 42 meshes with the sixth speed drive gear 26 and the seventh speed drive gear 27. The fourth-fifth speed driven gear 43 meshes with the fourth speed drive gear 24 and the fifth speed drive gear 25.

The parking gear 44 engages an engaging pawl of a parking gear mechanism (not shown), and the gear mechanism 10 can be locked and unlocked in accordance with operation of the parking gear mechanism. Torque of the transmission 1 is output through the final gear 45 to the differential gear mechanism (not shown).

The transmission 1 includes a first speed synchronization mechanism SY1 which connects the first speed drive gear 21 rotatable with respect to the first main input shaft 11 to the first main input shaft 11, a third-seventh speed synchronization mechanism SY2 which connects one of the third speed drive gear 23 and fifth speed drive gear 25 rotatable with respect to the first main input shaft 11 to the first main input shaft 11, a fifth speed synchronization mechanism SY3 which connects the fifth speed drive gear 25 rotatable with respect to the first main input shaft 11 to the first main input shaft 11, a second-sixth speed synchronization mechanism SY4 which connects one of the second speed drive gear 22 and sixth speed drive gear 26 rotatable with respect to the auxiliary input shaft 13 to the auxiliary input shaft 13, a fourth speed synchronization mechanism SY5 which connects the fourth speed drive gear 24 rotatable with respect to the auxiliary input shaft 13 to the auxiliary input shaft 13, and a reverse synchronization mechanism SY6 which connects the reverse drive gear 28 rotatable with respect to the reverse shaft 16 to the reverse shaft 16.

The first speed synchronization mechanism SY1 includes a hub HB1 fixed to an outer peripheral surface of the carrier 20d of the planetary gear unit 20 and a substantially cylindrical sleeve SL1 disposed around the hub HB1. An outer peripheral surface of the hub HB1 and an inner peripheral surface of the sleeve SL1 are formed with dog teeth (splines) D1 and D2, respectively, and the sleeve SL1 is engagingly supported via the dog teeth D1 and D2 to be axially movable along the outer peripheral surface of the hub HB1. Dog teeth D3 identical in diameter and pitch to the dog teeth D1 of the hub HB1 are formed on an outer peripheral surface of the first speed drive gear 21 concentrically with the dog teeth D1 of the hub HB1.

The sleeve SL1 is moved axially by an actuator (for example, electric motor) operating through a fork (not shown). When the sleeve SL1 is in neutral position as illustrated, the dog teeth D2 of the sleeve SL1 are separated from the dog teeth D3 of the first speed drive gear 21. At this time, the hub HB1 is rotatable with respect to the first speed drive gear 21.

When the sleeve SL1 is moved from neutral position toward the first speed drive gear 21 and reaches a first speed in-gear position, the dog teeth D2 of the sleeve SL1 engage (go in gear) with the dog teeth D3 of the first speed drive gear 21. As a result, the first speed drive gear 21 is connected to the first main input shaft 11 through the sleeve SL1, hub HB1, carrier 20d and sun gear 20a, whereby the first speed drive gear 21 can rotate integrally with the first main input shaft 11. When the first clutch C1 engages in this state, the first speed stage is established and rotation of the first main input shaft 11 is transmitted to the output shaft 14 through the sun gear 20a, planetary gear 20b, carrier 20d, hub HB1, first speed drive gear 21, third speed drive gear 23 and second-third speed driven gear 41, thus driving the vehicle in the first speed stage.

The third-seventh speed synchronization mechanism SY2, fifth speed synchronization mechanism SY3, second-sixth speed synchronization mechanism SY4, fourth speed synchronization mechanism SY5, and reverse synchronization mechanism SY6 are configured similarly to the first speed synchronization mechanism SY1.

More exactly, the third-seventh speed synchronization mechanism SY2 is located between the third speed drive gear 23 and the seventh speed drive gear 27 and includes a hub HB2 fixed on the first main input shaft 11 and a sleeve SL2 provided on an outer peripheral surface of the hub HB2 to be axially movable by means of dog teeth D1 and D2. When the sleeve SL2 moves from the neutral position of FIG. 1 to a third speed in-gear position at one axial side where the dog teeth D2 of the sleeve SL2 mesh (engage) with dog teeth D3 of the third speed drive gear 23, the third speed drive gear 23 connects to the hub HB2 through the sleeve SL2. This enables the third speed drive gear 23 to rotate integrally with the first main input shaft 11. When the first clutch C1 engages in this state, the third speed stage is established and rotation of the first main input shaft 11 is transmitted to the output shaft 14 through the hub HB1, the third speed drive gear 23 and the second-third speed driven gear 41, thus driving the vehicle in the third speed stage.

On the other hand, When the sleeve SL2 moves from the neutral position to a seventh speed in-gear position at the other axial side where the dog teeth D2 of the sleeve SL2 mesh (engage) with dog teeth D4 of the seventh speed drive gear 27, the seventh speed drive gear 27 connects to the hub HB2 through the sleeve SL2. This enables the seventh speed drive gear 27 to rotate integrally with the first main input shaft 11. When the first clutch C1 engages in this state, the seventh speed stage is established and rotation of the first main input shaft 11 is transmitted to the output shaft 14 through the hub HB2, the seventh speed drive gear 27 and the sixth-seventh speed driven gear 42, thus driving the vehicle in the seventh speed stage.

The fifth speed synchronization mechanism SY3 includes a hub HB3 fixed on the first main input shaft 11 and a sleeve SL3 provided on an outer peripheral surface of the hub HB3 to be axially movable by means of dog teeth D1 and D2. When the sleeve SL3 moves from the neutral position of FIG. 1 to a fifth speed in-gear position at one axial side where the dog teeth D2 of the sleeve SL3 mesh with dog teeth D3 of the fifth speed drive gear 25, the fifth speed drive gear 25 connects to the hub HB3 through the sleeve SL3. This enables the fifth speed drive gear 25 to rotate integrally with the first main input shaft 11. When the first clutch C1 engages in this state, the fifth speed stage is established and rotation of the first main input shaft 11 is transmitted to the output shaft 14 through the hub HB3, the fifth speed drive gear 25 and the fourth-fifth speed driven gear 43, thus driving the vehicle in the fifth speed stage.

The second-sixth speed synchronization mechanism SY4 includes a hub HB4 fixed on the auxiliary input shaft 13 and a sleeve SL4 provided on an outer peripheral surface of the hub HB4 to be axially movable by means of dog teeth D1 and D2. When the sleeve SL4 moves from the neutral position of FIG. 1 to a second speed in-gear position at one axial side where the dog teeth D2 of the sleeve SL4 mesh with dog teeth D3 of the second speed drive gear 22, the second speed drive gear 22 connects to the hub HB4 through the sleeve SL4. This enables the second speed drive gear 22 to rotate integrally with the auxiliary input shaft 13. When the second clutch C2 engages in this state, the second speed stage is established and rotation of the second main input shaft 12 is transmitted to the output shaft 14 through the idler gear 32, the gear 33, the auxiliary input shaft 13, the hub HB4, the second speed drive gear 22 and the second-third speed driven gear 41, thus driving the vehicle in the second speed stage.

On the other hand, When the sleeve SL4 moves from the neutral position to a sixth speed in-gear position at the other axial side where the dog teeth D2 of the sleeve SL4 mesh with dog teeth D4 of the sixth speed drive gear 26, the sixth speed drive gear 26 connects to the hub HB4 through the sleeve SL4. This enables the sixth speed drive gear 26 to rotate integrally with the auxiliary input shaft 13. When the second clutch C2 engages in this state, the sixth speed stage is established and rotation of the second main input shaft 12 is transmitted to the output shaft 14 through the idler gear 32, the gear 33, the auxiliary input shaft 13, the hub HB4, the sixth speed drive gear 26 and the sixth-seventh speed driven gear 42, thus driving the vehicle in the sixth speed stage.

The fourth speed synchronization mechanism SY5 includes a hub HB5 fixed on the auxiliary input shaft 13 and a sleeve SL5 provided on an outer peripheral surface of the hub HB5 to be axially movable by means of dog teeth D1 and D2. When the sleeve SL5 moves from the neutral position of FIG. 1 to a fourth speed in-gear position at one axial side where the dog teeth D2 of the sleeve SL5 mesh with dog teeth D3 of the fourth speed drive gear 24, the fourth speed drive gear 24 connects to the hub HB5 through the sleeve SL5. This enables the fourth speed drive gear 24 to rotate integrally with the auxiliary input shaft 13. When the second clutch C2 engages in this state, the fourth speed stage is established and rotation of the second main input shaft 12 is transmitted to the output shaft 14 through the idler gear 32, the gear 33, the auxiliary input shaft 13, the hub HB5, the fourth speed drive gear 24 and the fourth-fifth speed driven gear 43, thus driving the vehicle in the fourth speed stage.

The reverse synchronization mechanism SY6 includes a hub HB6 fixed on the reverse shaft 16 and a sleeve SL6 provided on an outer peripheral surface of the hub HB6 to be axially movable by means of dog teeth D1 and D2. When the sleeve SL6 moves from the neutral position of FIG. 1 to a reverse in-gear position at one axial side where the dog teeth D2 of the sleeve SL6 mesh with dog teeth D3 of the reverse drive gear 28, the reverse drive gear 28 connects to the hub HB6 through the sleeve SL6. This enables the reverse drive gear 28 to rotate integrally with the reverse shaft 16. When the second clutch C2 engages in this state, the reverse stage is established and rotation of the second main input shaft 12 is transmitted to the first main input shaft 11 through the idler gear 32, the gear 34, the reverse shaft 16, the hub HB6, the reverse drive gear 28 and the reverse driven gear 35, thus rotating the first main input shaft 11 in the opposite direction compared to the first speed driving, the third speed driving, the fifth speed driving and the seventh speed driving. Further, the sleeve SL2 of the third-seventh speed synchronization mechanism SY2 moves to the third in-gear position. Therefore, rotation of the first main input shaft 11 is transmitted to the output shaft 14 through the hub HB2, the third speed drive gear 23 and the second-third driven gear 41, and the vehicle backward drives.

Although not illustrated, among the synchronization mechanisms SY1 to SY6, taper-cone-shaped synchro rings are provided between the second speed drive gear 22 and the hub HB4, between the third speed drive gear 23 and the hub HB2, between the fourth speed drive gear 24 and the hub HB5, between the fifth speed drive gear 25 and the hub HB3, between the sixth speed drive gear 26 and the hub HB4, between the seventh speed drive gear 27 and the hub HB2, and between the reverse drive gear 28 and the hub HB6, respectively.

During gear engaging action, tapered surfaces of the synchro rings frictionally engage tapered surfaces of the speed drive gears 22 to 28 facing the synchro rings. Therefore, rotational speed difference between the dog teeth D2 and the dog teeth D3 and D4 becomes 0, and thus smooth gear engaging action can be carried out. The speed drive gears 23 to 28 are individually provided with shifting gears which engage associated driven gears 41 to 43 and 35 and with dog teeth D3 or D4. On the other hand, no synchro ring is provided between the first speed drive gear 21 and the hub HB1. Moreover, the first speed drive gear 21 is provided only with dog teeth D3 and not with a shifting gear for engagement with the driven gear.

In the foregoing, vehicle driving solely by torque from the engine 2, i.e., engine driving, is explained, but assist torque from the electric motor 3 can also be applied to the first main input shaft 11 in addition to the torque from the engine 2. Moreover, vehicle driving solely by torque from the electric motor 3 instead of torque from the engine 2, i.e. motor driving (EV driving), is also possible.

Figure 5A:
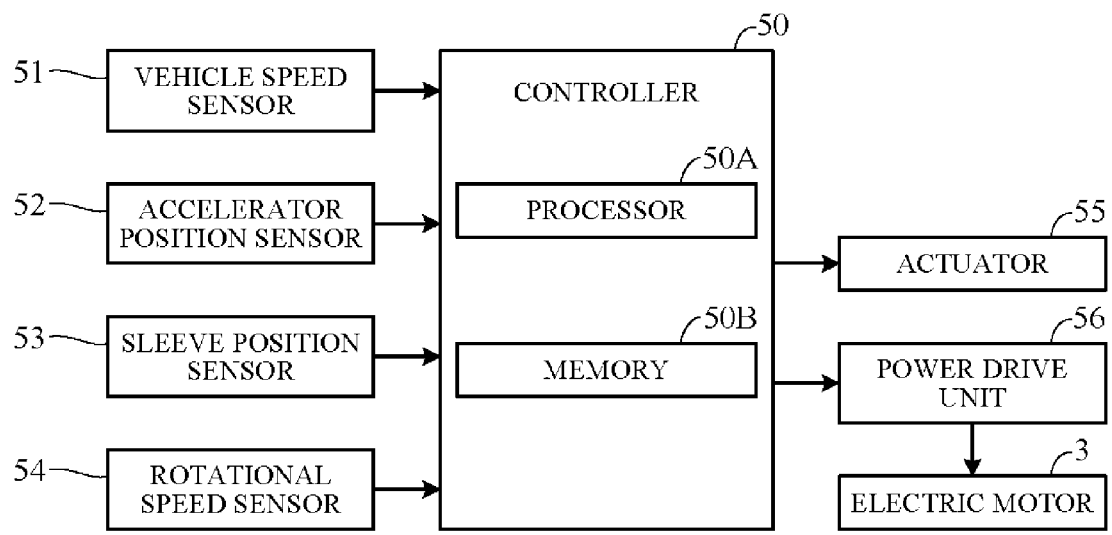
FIG. 5A is a block diagram showing a configuration of the control apparatus for the transmission according to the embodiment of the present invention.

The sleeves SL1 to SL6 are moved from the neutral position to the in-gear position and from the in-gear position to the neutral position by individually associated electric motors or other such actuators (FIG. 5A). Driving of the actuators is controlled by the controller. The controller selects a speed stage in response to manipulation of a selector adapted for selecting among, for example, L, D, N, R and P shift ranges. In particular, when the selector is put in D range, which is automatic shift mode, the speed stage is automatically selected based on accelerator pedal depression amount and vehicle speed. In such case, the controller decides desired torque in response to amount of accelerator pedal depression and pre-shifts the transmission 1 according to the desired torque, thus enabling a rapid gear shifting action.

For example, in a state where the first clutch C1 is engaged and the second clutch C2 is disengaged, when desired torque increases during driving in the third gear, the controller determines that acceleration is desired and pre-shifts to select the fourth speed stage. Specifically, it performs an up-shift by moving the sleeve SL5 of the fourth speed synchronization mechanism SY5 to the fourth speed in-gear position. On the other hand, when desired torque decreases during driving in the third gear, the controller determines that deceleration is desired and pre-shifts to select the second speed stage. Specifically, it performs a down-shift by moving the sleeve SL4 of the second-sixth speed synchronization mechanism SY4 to the second speed in-gear position.

Figure 2:
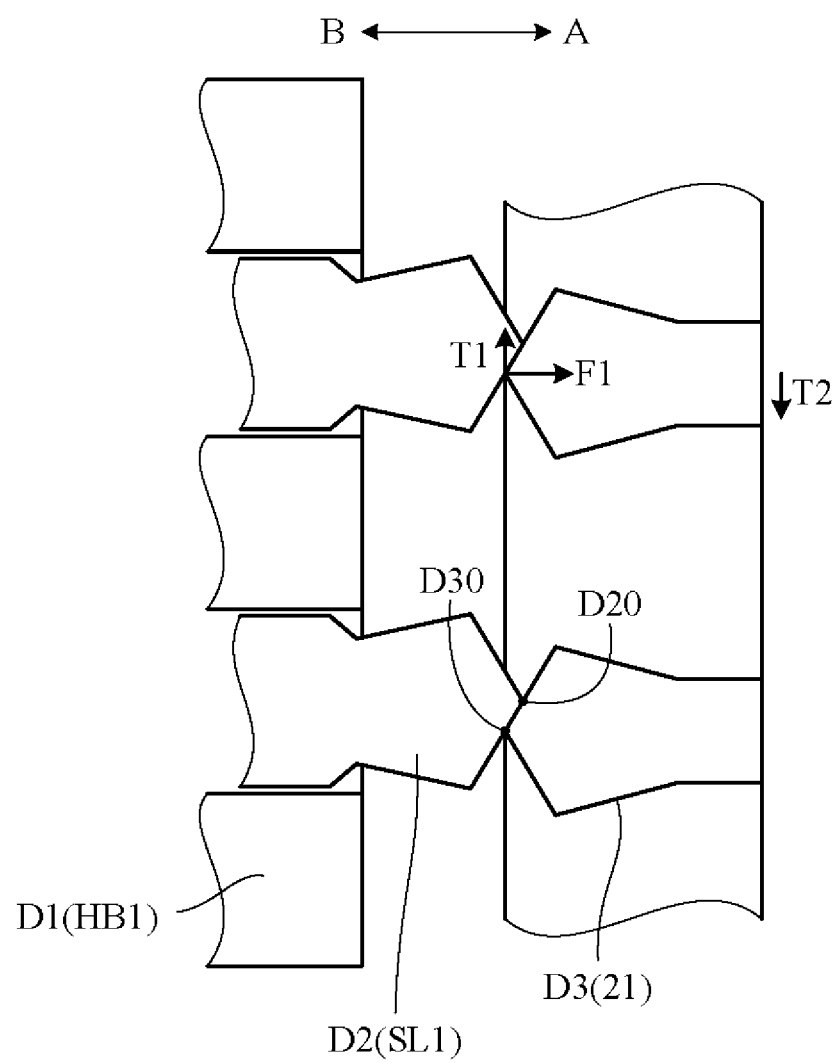
FIG. 2 is a diagram of two-dimensional developments of dog teeth of a first speed drive gear and dog teeth of a sleeve included in the transmission of FIG. 1, and is the diagram showing an example of a phase between the dog teeth.
Figure 3:
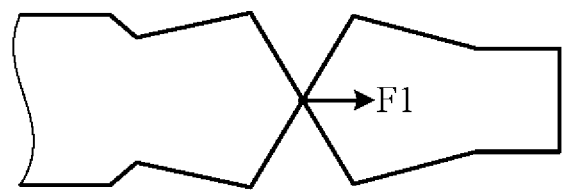
FIG. 3 is a diagram of two-dimensional developments of dog teeth of the first speed drive gear and dog teeth of the sleeve included in the transmission of FIG. 1, and is the diagram showing another example of a phase between the dog teeth.
Figure 3:
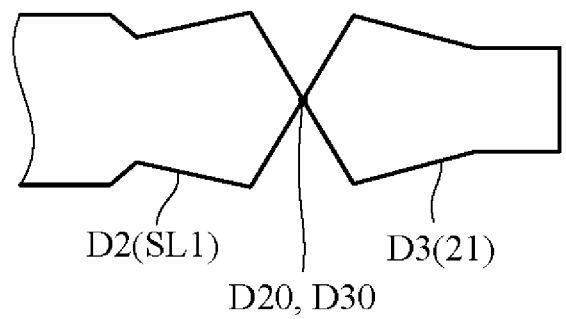

In this connection, despite the controller having output a drive command to the actuator to move the associated one of the sleeves SL1 to SL6 from the neutral position to the in-gear position, the sleeve sometimes does not move to the in-gear position, so that the dog teeth D2 of the sleeve cannot mesh with the dog teeth D3 or D4 of the associated one of the speed drive gears 21 to 28. This point is explained below with reference to FIGS. 2 and 3. FIGS. 2 and 3 are two-dimensional developments of the dog teeth D2 of the sleeve SL1 of the first speed synchronization mechanism SY1 and of the dog teeth D3 of the first speed drive gear 21, showing the sleeve SL1 in the course of moving to first speed in-gear position.

As shown in FIG. 2, the dog teeth D2 and dog teeth D3 both have substantially triangular tip portions. The dog teeth D2 move toward the dog teeth D3 in the direction of arrow "A", and when sloped faces at the ends of the dog teeth D1 and D3 contact one another with apices D20 of the dog teeth D2 and apices D30 of the dog teeth D3 in a phase-shifted state, the dog teeth D2 exert pushing force F1 on the dog teeth D3 in the direction of arrow "A". The pushing force F1 produces a reaction force in the dog teeth D2 (push-aside torque T1) acting in the rotational direction and produces a push-aside torque T2 in the dog teeth D3 acting in the opposite direction from that in the dog teeth D2. As a result, the sleeve SL1 (dog teeth D2) moves in the direction of arrow "A" while pushing aside the dog teeth D3, whereby the sleeve SL1 ultimately moves to the first speed in-gear position at which the dog teeth D2 and D3 are completely meshed with each other.

On the other hand, when, as shown in FIG. 3, the apices D20 of the dog teeth D2 or the vicinity thereof abut the apices D30 of the dog teeth D3, only the axial direction pushing force F1 acts on the dog teeth D3 and no push-aside torques occur in the directions of rotation of the dog teeth D2 and D3. Therefore, the sleeve SL1 cannot advance any farther in the direction of arrow "A" and the gear engaging action fails. One conceivable way to deal with this would be to once move the sleeve SL1 in the direction of arrow B (toward the neutral position) until the dog teeth D2 separate from the dog teeth D3 and then move the sleeve SL1 back in the direction of arrow "A".

However, moving the sleeve SL1 in the direction of arrow B delays gear engaging action by the time required for moving the sleeve SL1, so that a rapid shift operation is hard to achieve. Moreover, when the sleeve SL1 is once moved in the direction of arrow B and then moved back in the A direction, the apices D20 and D30 of the dog teeth D2 and D3 may again abut each other and make gear engagement of the sleeve SL1 impossible. In the present embodiment, therefore, the control apparatus for a transmission is configured as set out below in order to realize shift operations in a short time even when the apices D20 and D30 of the dog teeth D2 and D3 abut each other.

Figure 4:
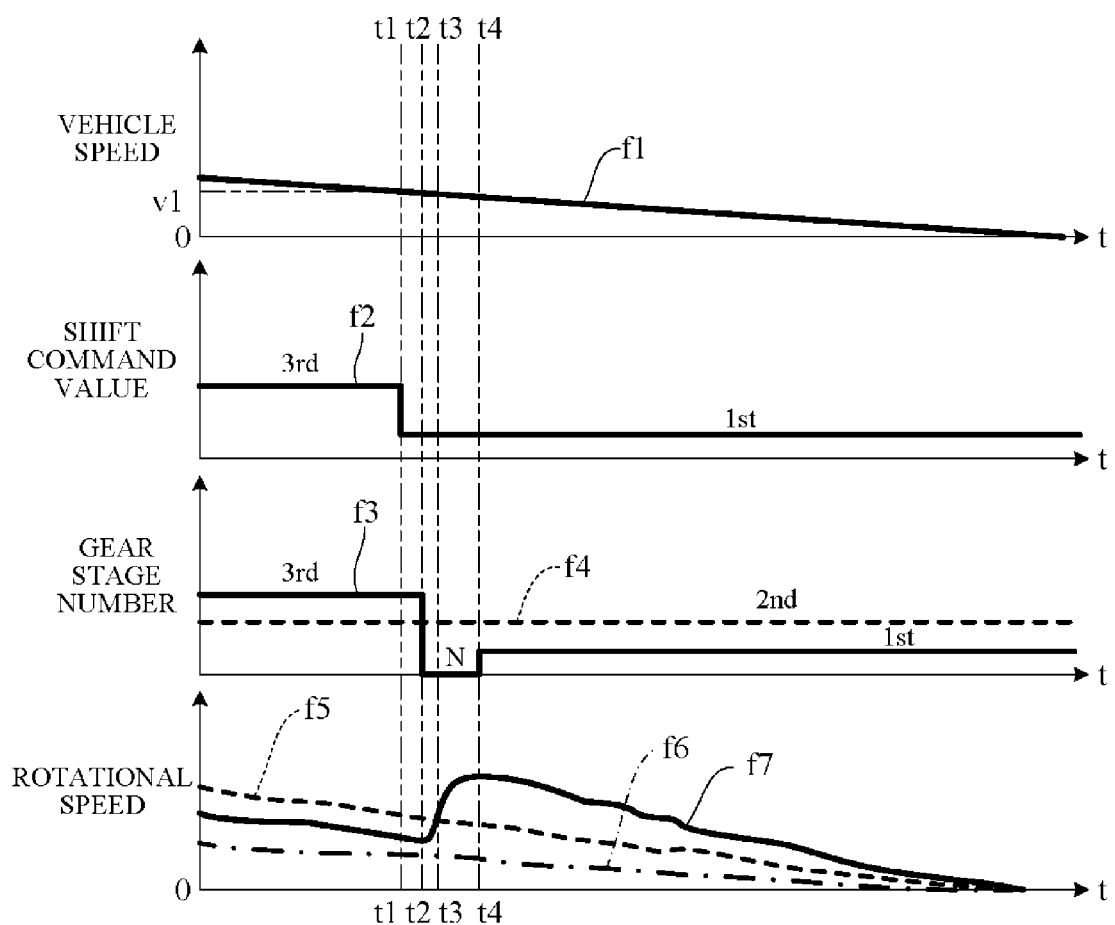
FIG. 4 is a timing chart showing an example of an operation in the control apparatus according to the embodiment of the present invention.

As an example, a case is explained in the following in which the control apparatus for a transmission performs gear engagement control of the first speed synchronization mechanism SY1 to shift from the third speed stage to the first speed stage when decelerating during EV driving (during EV deceleration driving). In other words, a case in which the first main input shaft 11 is powered and the vehicle is driven solely by torque from the electric motor 3 is taken as an example. FIG. 4 is a timing chart showing examples of vehicle speed during EV deceleration driving, shift command value, gear stage number of the first main input shaft 11 (rotating shaft for odd-numbered speed stages; solid line) and gear stage number of the auxiliary input shaft 13 (rotating shaft for even-numbered speed stages; dashed line), and time-course change of rotational speed of the first main input shaft 11, auxiliary input shaft 13 and other rotating shafts (for example, drive shaft connected to the drive wheels).

As shown in FIG. 4, during EV deceleration driving, vehicle speed gradually decreases with passage of time t (characteristic curve f1). In the course of the decrease, a shift command value designating the third speed stage is maintained until time t1 (characteristic curve f2). Therefore, the first main input shaft 11 is connected through the third-seventh speed synchronization mechanism SY2 to the third speed drive gear 23, thus driving the vehicle in the third speed stage (characteristic curve f3). On the other hand, the auxiliary input shaft 13 is connected to the second speed drive gear 22 by a pre-shift (characteristic curve f4).

When vehicle speed becomes equal to or slower than a set vehicle speed V1 at time t1 (characteristic curve f1), the shift command value skips the second speed stage and designates the first speed stage (characteristic curve f2). As a result, the sleeve SL2 of the third-seventh speed synchronization mechanism SY2 starts to move from the third speed in-gear position to the neutral position (N), and at time t2 the first main input shaft 11 becomes the neutral state disconnected from the third speed drive gear 23 (characteristic curve f3). Thereafter, at time t4, the sleeve SL1 of the first speed synchronization mechanism SY1 moves from the neutral position to the first speed in-gear position, thus establishing the first speed stage (characteristic curve f3).

During EV deceleration driving, the rotational speed of the auxiliary input shaft 13 indicated by a dashed line (characteristic curve f5) and the rotational speed of the driveshaft indicated by a one-dot-dashed line (characteristic curve f6) decrease with decreasing vehicle speed. On the other hand, the rotational speed of the first main input shaft 11 indicated by a solid line (characteristic curve f7) once increases when the first main input shaft 11 is in the neutral position between times t3 and t4, which point is discussed further below.

FIG. 5A is a block diagram showing a configuration of the control apparatus for the transmission according to an embodiment of the present invention. This control apparatus includes components for switching the transmission from third speed stage to first speed stage during EV deceleration driving. As shown in FIG. 5A, a controller 50 receives signals from a vehicle speed sensor 51 for detecting vehicle speed, an accelerator position sensor 52 for detecting amount of depression of the accelerator pedal, a sleeve position sensor 53 for detecting position of the sleeve SL1 of the first speed synchronization mechanism SY1, and a rotational speed sensor 54 for detecting rotational speed of the electric motor 3 (rotor 3a).

As shown in FIG. 1, a pulse gear 16a is provided on the reverse shaft 16, and, for example, the vehicle speed sensor 51 is constituted as a pick-up sensor capable of detecting forward and reverse rotation of the pulse gear 16a. This is because the auxiliary input shaft 13 and reverse shaft 16 rotate together with the output shaft 14 during the vehicle driving, so that rotational speed of the reverse shaft 16 is correlated with vehicle speed and vehicle speed can therefore be detected by detecting rotation of the reverse shaft 16.

Detecting vehicle speed from rotational speed of the reverse shaft 16 in this manner makes it possible to increase sensor resolution and enhance vehicle speed detection accuracy compared to the case of detecting vehicle speed from, for example, rotational speed of the driveshaft. This is because rotational speed variation characteristics of the reverse shaft 16 and rotational speed variation characteristics of the auxiliary input shaft 13 indicated by characteristic curve f5 in FIG. 4 are the same, and since sensor resolution is therefore higher than that in the case of characteristic curve f6, vehicle speed can be accurately detected. Moreover, rotational speed of the first speed drive gear 21 and rotational speed of the reverse shaft 16 are correlated because, as seen in FIG. 1, the first speed drive gear 21 becomes one body with the third speed drive gear 23 meshed with the second-third speed driven gear 41 and therefore rotates together with the reverse shaft 16. Detecting rotation of the reverse shaft 16 with the vehicle speed sensor 51 therefore enables rotation of the first speed drive gear 21 also to be accurately detected.

The sleeve position sensor 53 can, for example, be constituted as a position sensor connected to the sleeve SL1 of the first speed synchronization mechanism SY1 and adapted to detect position of a shift fork which moves together with the sleeve SL1. Alternatively, the sleeve position sensor 53 can be constituted as a contact switch or the like which turns ON when the sleeve SL1 moves to the first-speed in-gear position.

The controller 50 is configured to include an arithmetic processing unit (a processing circuit) having a processor 50A (CPU), a memory 50B coupled to the processor 50A (ROM and RAM) and other peripheral circuits, and outputs control signals to actuators 55 for axially moving the sleeves SL1 to SL6 and to a power drive unit 56 for driving the electric motor 3.

Figure 5B:
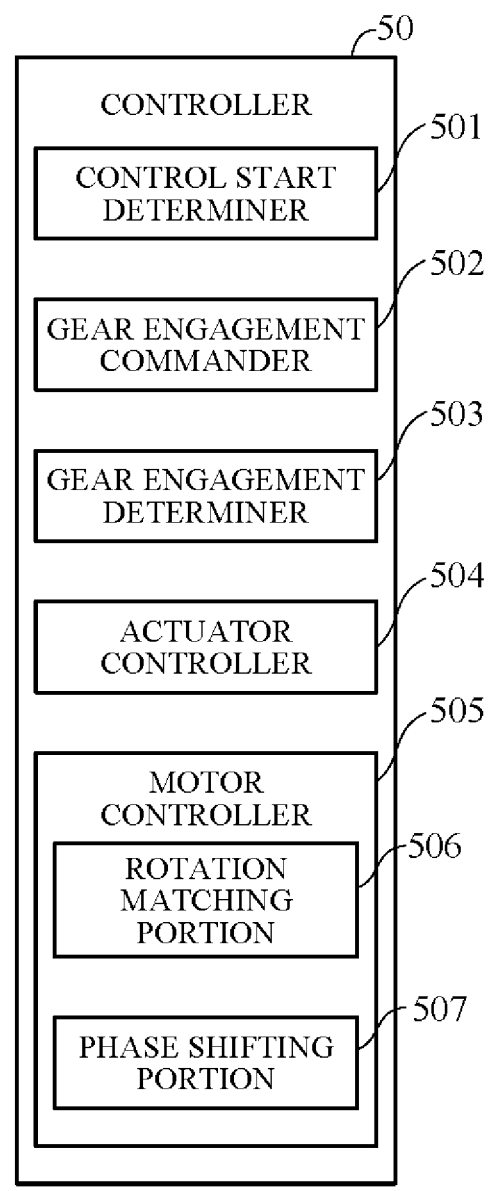
FIG. 5B is a block diagram showing a functional configuration of a controller of FIG. 5A.

FIG. 5B is a block diagram showing a functional configuration of the controller 50. As shown in FIG. 5B, as functional constituents, the controller 50 has a control start determiner 501, a gear engagement commander 502, a gear engagement determiner 503, an actuator controller 504, and a motor controller 505. The motor controller 505 has a rotation matching portion 506 and a phase shifting portion 507.

The control start determiner 501 determines presence or absence of shift control start condition for shifting from the third speed stage to the first speed stage during EV deceleration driving. The shift control start condition is present when vehicle speed during EV driving in the third speed stage is equal to or slower than a predetermined speed v1 (time t1 in FIG. 4). Therefore, the control start determiner 501 uses the current shift command value and the signal from the vehicle speed sensor 51 to determine presence or absence of the shift control start condition.

After the control start determiner 501 determines presence of the shift control start condition, the gear engagement commander 502 determines presence or absence of engagement control start condition, and when presence of the engagement control start condition is determined, instructs start of a gear engaging action of the first speed synchronization mechanism SY1. The engagement control start condition is satisfied when difference between rotational speed of the sleeve SL1 of the first speed synchronization mechanism SY1 (sleeve rotational speed N1$s$) and rotational speed of the first speed drive gear 21 (gear rotational speed N1$g$) is equal to or smaller than a predetermined value. The rotational speed of the sleeve SL1 is correlated to the rotational speed of the first main input shaft 11, so that the sleeve rotational speed N1$s$ (rpm) during EV driving can be obtained using the signal from the rotational speed sensor 54. On the other hand, the gear rotational speed N1$g$ (rpm) can be obtained using the signal from the vehicle speed sensor 51.

The gear engagement determiner 503 uses the signal from the sleeve position sensor 53 to determine whether the dog teeth D2 of the sleeve SL1 have engaged with the dog teeth D3 of the first speed drive gear 21, i.e., to determine whether the gear engaging action is prevented in the course of moving the sleeve SL1 from the neutral position to the first speed in-gear position. More specifically, the gear engagement determiner 503 uses the signal from the sleeve position sensor 53 to calculate moving distance of the sleeve SL1 per unit time, i.e., sleeve moving speed Vs. Then, when the apices of the dog teeth D2 and D3 abut each other to slow sleeve moving speed Vs to or below a predetermined value Vs1, the gear engagement determiner 503 determines that the gear engaging action is prevented.

When the control start determiner 501 determines that the shift control start condition is satisfied, the actuator controller 504 outputs a control signal to the actuator 55 to move the sleeve SL2 of the third-seventh speed synchronization mechanism SY2 from the third speed in-gear position to the neutral position. In addition, when the gear engagement commander 502 instructs start of the gear engaging action of the first speed synchronization mechanism SY1, the actuator controller 504 outputs a control signal to the actuator 55 to move the sleeve SL1 of the first speed synchronization mechanism SY1 from the neutral position to the first speed in-gear position.

The motor controller 505 outputs a control signal to the power drive unit 56 to control operation of the electric motor 3, i.e., to control rotating activity of the first main input shaft 11. More specifically, after the sleeve SL2 of the third-seventh speed synchronization mechanism SY2 has moved from the third speed in-gear position to the neutral position, the rotation matching portion 506 controls rotation of the electric motor 3 to match sleeve rotational speed N1$s$ detected from the signal from the rotational speed sensor 54 with gear rotational speed N1$g$ detected from the signal from the vehicle speed sensor 51.

When the gear engagement determiner 503 determines that engaging the dog teeth D2 of the sleeve SL1 of the first speed synchronization mechanism SY1 with the dog teeth D3 of the first speed drive gear 21 has failed, the phase shifting portion 507 outputs a control signal to the power drive unit 56, thereby driving the electric motor 3 to output a predetermined torque and shifting the phase of the sleeve SL1 with respect to the first speed drive gear 21.

Figure 6:
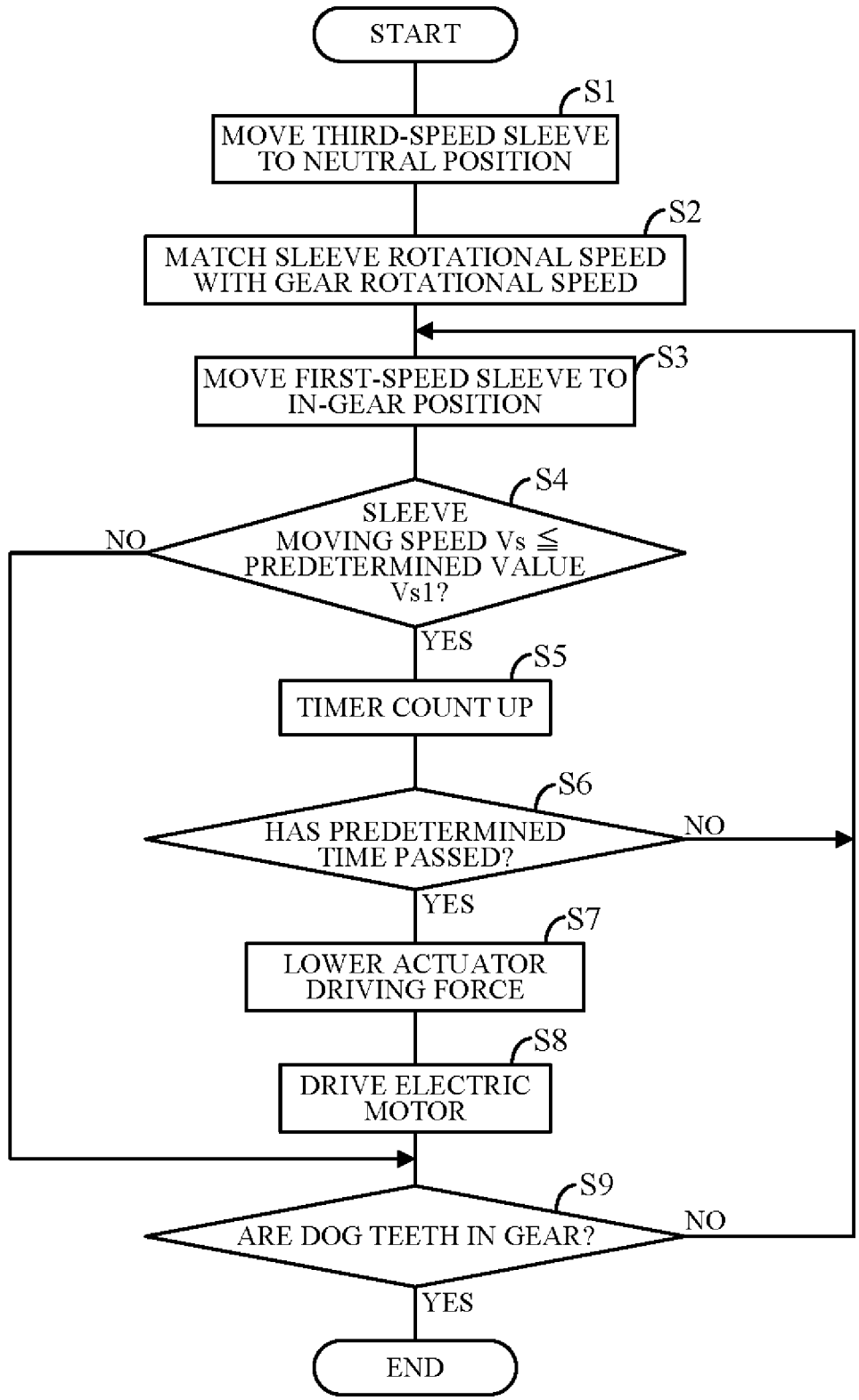
FIG. 6 is a flowchart showing an example of processing executed by the controller of FIG. 5A.

FIG. 6 is a flowchart showing an example of processing executed by the processor 50A of the controller 50. The processing indicated by this flowchart is initiated when the control start determiner 501 determines that the shift control start condition is established.

First, in S1 (S: processing step), the actuator controller 504 outputs a control signal to the actuator 55 to move the third-speed sleeve SL2 from the third speed in-gear position to the neutral position. Next, in S2, the rotation matching portion 506 outputs a control signal to the power drive unit 56 to match rotational speed N1$s$ of the first-speed sleeve SL1 with rotational speed N1$g$ of the first speed drive gear 21. The processing of S2 is continued until rotational speed difference between the sleeve rotational speed N1$s$ and the gear rotational speed N1$g$ becomes equal to or smaller than a predetermined value and the gear engagement commander 502 determines that the engagement control start condition is established.

Next, in S3, the actuator controller 504 outputs a control signal to the actuator 55 to move the first-speed sleeve SL1 from the neutral position to the first speed in-gear position at a set speed Vs0. The driving force of the actuator 55, i.e., voltage Va applied to the actuator 55, at this time is a predetermined value Va0. Next, in S4, the gear engagement determiner 503 determines whether moving speed Vs of the sleeve SL1 becomes equal to or slower than a predetermined value Vs1. The predetermined value Vs1 is set in advance to be greater than 0 and smaller than the set speed Vs0. When the result in S4 is YES, the program goes to S5, and when NO, skips S5 to S8 and goes to S9.

In S5, a timer begins to count up. Next, in S6, whether the timer has counted a predetermined time Δt1, i.e., whether predetermined time Δt1 has passed since the sleeve moving speed Vs became equal to or slower than the predetermined value Vs1 is determined. When the result in S6 is NO, the program returns to S3 to repeat the same processing. When the result in S6 is YES, the program goes to S7.

In S7, the actuator controller 504 lowers actuator driving force by reducing a voltage applied to the actuator 55 (actuator voltage Va) from the predetermined value Va0 to a predetermined value Va1. Next, in S8, the phase shifting portion 507 outputs a control signal to the power drive unit 56 to drive the electric motor 3 to output a predetermined motor torque MT1. This forcibly shifts phase of the sleeve SL1 with respect to the first speed drive gear 21.

Next, in S9, the gear engagement determiner 503 uses the signal from the sleeve position sensor 53 to determine whether the dog teeth D2 and D3 are completely in gear. This determination corresponds to determining whether the sleeve SL1 moved to the first speed in-gear position L1. When the result in S9 is NO, the program returns to S3 repeat the same processing. When the result in S9 is YES, gear engagement control of the first speed synchronization mechanism SY1 is terminated.

Figure 7:
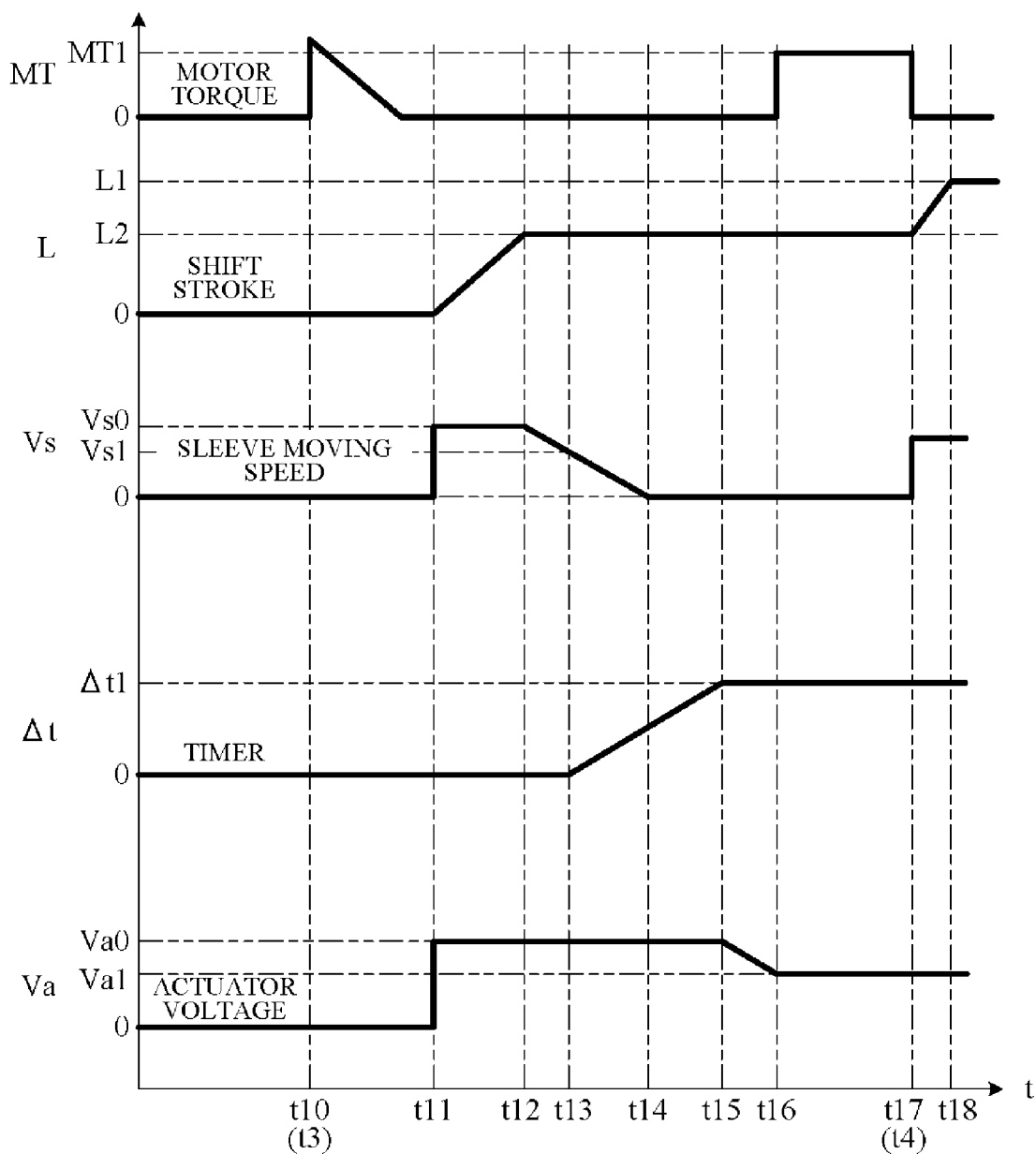
FIG. 7 is a timing chart showing an example of an operation different from FIG. 4.

In the following, operation of the control apparatus for a transmission in accordance with this embodiment of the present invention is explained in more detail with reference to FIG. 7. FIG. 7 is a timing chart showing examples of time-course change of motor torque MT generated by the electric motor 3, axial movement amount (shift stroke L) of the sleeve SL1, sleeve moving speed Vs, elapsed time Δt1 on timer, and actuator voltage Va. Times t10 and t17 in FIG. 7 respectively correspond to times t3 and t4 in FIG. 4. The gear engagement control is performed during the period between times t10 and t17.

Since time t10 in FIG. 7 is later than time t2 in FIG. 4, the third-speed sleeve SL2 is already moving from the third speed in-gear position toward the neutral position at time t0. At time t10, a control signal is output to the power drive unit 56 to implement matching of rotational speed N1s of the first-speed sleeve SL1 with gear rotational speed N1g of the first speed drive gear 21 (S2). As a result, the motor torque MT increases and, as shown by characteristic curve f7 in FIG. 4, the rotational speed of the first main input shaft 11 increases. Upon completion of the rotational speed matching, the motor torque MT becomes 0. Following this, a control signal (predetermined value Va0) is output to the actuator 55 at time t11 in FIG. 7 (S3). Sleeve moving speed Vs therefore becomes predetermined speed Vs0, and the sleeve SL1 starts moving from neutral position, where shift stroke L=0, toward the first speed in-gear position L1.

By matching the rotations of the sleeve SL1 and the first speed drive gear 21 in this manner, the dog teeth D2 and D3 can be smoothly gear-engaged with each other even without interposing a synchro ring between the first-speed sleeve SL1 and the first speed drive gear 21. As a result, synchronization between the first speed drive gear 21 and a synchro ring is unnecessary, so that time required for gear engagement can be shortened.

Now assume a case in which, at time t12 when the shift stroke is L2 before the sleeve SL1 reaches the first speed in-gear position L1, the apices of the dog teeth D2 and D3 abut each other, i.e. that apex collision occurs (the dog teeth D2 and D3 catch on each other). In this case, the sleeve moving speed Vs decreases, and it is determined that apex collision of the dog teeth D2 and D3 occurs when sleeve moving speed Vs becomes equal to or slower than the predetermined value Vs1 at time t13, whereupon the timer begins to count (S5). This enables prompt gear engaging action because presence or absence of apex collision of the dog teeth D2 and D3 can be determined before the sleeve moving speed Vs decreases to 0 (before time t14).

When the timer count reaches predetermined time Δt1 at time t15, actuator voltage Va is decreased (S7). Axial direction pushing force F1 (FIG. 3) exerted on the dog teeth D3 therefore decreases. When the actuator voltage Va decreases to the predetermined value Va1 at time t16, a predetermined motor torque MT1 is output between time t16 and time t17 (S8). By outputting the motor torque MT1 after decreasing the actuator voltage Va in this manner, the first main input shaft 11 can be easily rotated while abutting the dog teeth D2 and D3 with each other. As a result, phase of the dog teeth D2 with respect to the dog teeth D3 changes to resolve apex collision condition of the dog teeth D2 and D3.

Moreover, since the actuator voltage Va is decreased after the timer count reaches the predetermined time Δt1, output of motor torque MT1 becomes unnecessary in a case where the sleeve SL1 is again to be moved at prescribed speed Vs0 by applying actuator voltage Va0 before elapse of predetermined time Δt1. As a result, prompt gear-engage action becomes possible in a case where, for example, the apices of the dog teeth D2 and D3 spontaneously shift in phase before elapse of the predetermined time Δt1.

When output of motor torque MT1 is stopped at time t17, the dog teeth D2 and D3 are shifted in phase. As a result, the sleeve SL1 again becomes movable toward the first speed in-gear position L1 and shift stroke L expands. When the sleeve SL1 reaches the first speed in-gear position L1 at time t18, the gear engaging action is complete and first speed stage is established.

This embodiment of the present embodiment can achieve advantages and effects such as the following:

(1) The transmission 1 includes the first main input shaft 11 rotatable by the electric motor 3, the hub HB1 rotatably provided concentrically on the first main input shaft 11, the sleeve SL1 which has the dog teeth D2 and is supported on the hub HB1 via the dog teeth D2 to be axially movable, the first speed drive gear 21 rotatably provided concentrically on the first main input shaft 11 and having the dog teeth D3 arranged beside the sleeve SL1 in the axial direction to be engageable with the dog teeth D2, and the actuator 55 for moving the sleeve SL1 between the neutral position where the dog teeth D2 are apart from the dog teeth D3 and the first speed in-gear position where the dog teeth D2 engage with the dog teeth D3, in which, when the dog teeth D2 are in the neutral position, the hub HB1 is supported to be integrally rotatable with the first main input shaft 11 and the first speed drive gear 21 is supported to be rotatable relative to the first main input shaft 11, and when the dog teeth D2 move to the first speed in-gear position, the first speed drive gear 21 becomes integrally rotatable with the first main input shaft 11 to enable establishment of the first speed stage (FIG. 1). The control apparatus for this transmission 1 includes the gear engagement commander 502 for outputting the gear engagement command of the sleeve SL1, the actuator controller 504 for controlling the actuator 55 responsive to output of the gear engagement command so that the sleeve SL1 moves from the neutral position to the first speed in-gear position, the gear engagement determiner 503 for determining whether the gear engaging action of the sleeve SL1 is prevented in the course of moving the sleeve SL1 from the neutral position to the first speed in-gear position using the actuator 55, and the motor controller 505 (the phase shifting portion 507) for controlling the electric motor 3 responsive to determination by the gear engagement determiner 503 that the gear engaging action of the sleeve SL1 is prevented so as to rotate the first main input shaft 11 and shift the phase of the dog teeth D2 with respect to the dog teeth D3 (FIGS. 5A and 5B).

Thus, when the gear engaging action of sleeve SL1 is prevented, the sleeve SL1 is not returned to the neutral position but the motor torque MT1 is added to the first main input shaft 11 to shift the phase of the dog teeth D2 with respect to the dog teeth D3, whereby time required for the gear engaging action can be shortened and rapid gear shifting action achieved.

(2) The gear engagement determiner 503 uses the signal from the sleeve position sensor 53 to calculate axial direction moving speed Vs of the sleeve SL1 and determines that the gear engaging action of the sleeve SL1 is prevented when the sleeve moving speed Vs decreases to or below the predetermined value Vs1 greater than 0 (FIG. 7). Therefore, before sleeve moving speed Vs becomes 0, it can be determined that gear engagement is disabled owing to, for example, abutment of the dog teeth D2 and D2 apices with each other, thus making it possible to promptly start gear engagement control for resolving abutment between the apices (apex collision).

(3) When the prevented state of gear engaging action of the sleeve SL1 determined by the gear engagement determiner 503 continues for predetermined time Δt1, the phase shifting portion 507 controls the electric motor 3 to shift phase of the dog teeth D2 with respect to the dog teeth D3 (FIG. 7). This suspension of motor torque MT1 addition by the predetermined time Δt1 following occurrence of the gear engaging action prevention makes it possible to implement gear engaging action promptly without addition of motor torque MT1 in a case where the phase relation between the dog teeth D2 and D3 shifts spontaneously within predetermined time Δt1.

(4) When the gear engagement determiner 503 determines that the gear engaging action of the sleeve SL1 is prevented, the actuator controller 504 decreases driving force of the actuator 55, and after the driving force of the actuator 55 is decreased by the actuator controller 504, the phase shifting portion 507 controls the electric motor 3 to shift the phase of the dog teeth D2 with respect to the dog teeth D3 (FIG. 7). Therefore, since motor torque is added in a state that pushing force F1 between the dog teeth D2 and D3 is reduced, the phase relation between the dog teeth D2 and D3 can be easily shifted because the first main input shaft 11 can be easily rotated by addition of small motor torque MT1.

(5) The rotation matching portion 506 controls the electric motor 3 to match rotational speed N1g of the first speed drive gear 21 detected from the signal from the vehicle speed sensor 51 and rotational speed N1s of the sleeve SL1 detected from the signal from the rotational speed sensor 54 (S2), and after the rotation matching portion 506 controls the electric motor 3 to match the rotational speed N1g of the first speed drive gear 21 and the rotational speed N1s of the sleeve SL1, the actuator controller 504 controls the actuator 55 to move the sleeve SL1 from the neutral position to the first speed in-gear position (S3). This rotational matching of the dog teeth D2 and D3 by adding motor torque to the first main input shaft 11 makes a synchro ring unnecessary in the first speed synchronization mechanism SY1. Therefore, time from establishment of shift control start condition by the control start determiner 501 to completion of the gear engagement of the first speed synchronization mechanism SY1 can be shortened.

Although operation in the case of shifting from third speed stage to first speed stage during EV deceleration driving is explained in the foregoing, the control apparatus for the transmission according to the embodiment of the present invention can be similarly applied to other driving operations. For example, application is also possible in a case that the vehicle starts moving by EV driving from a stopped state at vehicle speed 0. In this case, sleeve rotational speed N1s and gear rotational speed N1g are initially both 0 and rotation speed matching of the two is unnecessary. It therefore suffices for the controller 50 to begin gear engagement control processing from S3 of FIG. 6.

Although the control apparatus for the transmission is applied for gear engagement control of the first speed synchronization mechanism SY1 in the above embodiment, it can be similarly applied for gear engagement control of the third-seventh speed synchronization mechanism SY2 or the fifth speed synchronization mechanism SY3. In other words, the control apparatus for the transmission according to the embodiment of the present invention can be similarly applied for gear engagement control of the synchronization mechanisms SY2 and SY3 located around the first main input shaft 11 connected to the electric motor 3. Alternatively, it is possible to connect an electric motor to the auxiliary input shaft 13 and use the auxiliary input shaft 13 instead of the first main input shaft 11 as a rotating shaft rotatable by an electric motor. In this case, the control apparatus for the transmission according to the embodiment of the present invention can be similarly applied for gear engagement control of the second-sixth speed synchronization mechanism SY4 or for gear engagement control of the fourth speed synchronization mechanism SY5.

Therefore, although in the above embodiment, the first speed drive gear 21 as a rotor arranged beside the sleeve SL1 in the axial direction has only the dog teeth D3 (passive dog teeth) engageable with the axially movable dog teeth D2 (movable dog teeth), a rotor may have dog teeth D3 or D4 and a shifting gear similarly to the other drive gears 22 to 28. Although in the above embodiment, the hub HB1 is provided to be rotatable integrally with the first main input shaft 11 (rotating shaft) through the planetary gear unit 20, and the first speed drive gear 21 (rotor) is provided to be rotatable relative to the first main input shaft 11, a transmission can be of any configuration insofar as a hub is supported to be rotatable integrally with a rotating shaft and a rotor is supported to be rotatable relative to the rotating shaft when the dog teeth D2 are in a neutral position, and the rotor is rotatable integrally with the rotating shaft to establish a predetermined speed stage when the dog teeth D2 move to a gear engaging position. The rotating shaft is not limited to the first main input shaft 11 and the rotor is not limited to the first speed drive gear 21.

Although in the above embodiment, the actuator 55 for moving the sleeve from a neutral position and a gear engaging position is constituted of an electric motor, the actuator can be constituted by other components (a hydraulic cylinder or the like, for example). Although in the above embodiment, the sleeve moving speed Vs is detected from the signal from the sleeve position sensor 53, a moving speed detector is not limited to this configuration. In the aforesaid embodiment, when the state of the gear engagement determiner 503 having determined that the gear engaging action is prevented continues for the predetermined time Δt1, the motor controller 505 (phase shifting portion 507) operates as a motor controller for controlling the electric motor 3 to shift the phase of the dog teeth D2 constituting movable dog teeth with respect to the dog teeth D3 constituting passive dog teeth, but the motor torque can be added without waiting for the predetermined time Δt1 to pass.

In the above embodiment, when the gear engagement determiner 503 determines that gear engaging action is prevented, the electric motor 3 is controlled to shift the phase (change rotational position) of the dog teeth D2 with respect to the dog teeth D3 after the driving force of the actuator 55 is decreased. However, it is instead possible to attempt changing the rotational position of the dog teeth without decreasing the driving force of the actuator 55. Although in the above embodiment, the rotational speed N1g of the rotor (first speed drive gear 21) is detected from the signal from the vehicle speed sensor 51, a first rotational speed detector is not limited to this configuration. Although in the above embodiment, the rotational speed N1s of the sleeve SL1 is detected from the signal from the rotational speed sensor 54, a second rotational speed detector is not limited to this configuration.

The above embodiment can be combined as desired with one or more of the aforesaid modifications. The modifications can also be combined with one another.

According to the present invention, when an engaging action of a sleeve is prevented, a rotating shaft is rotated by an electric motor to change a rotational position of movable dog teeth of a sleeve relative to passive dog teeth of a rotor. Therefore, even if apices of the movable and passive dog teeth abut each other and a gear engaging action is prevented, it is unnecessary to return the sleeve to a neutral position. As a result, time required for the gear engaging action can be shortened and it is possible to carry out prompt shifting action.

Above, while the present invention has been described with reference to the preferred embodiments thereof, it will be understood, by those skilled in the art, that various changes and modifications may be made thereto without departing from the scope of the appended claims.

What is claimed is:

1. A control method for a transmission that includes:
a rotating shaft rotatable by an electric motor;
a hub configured to rotate integrally with the rotating shaft;
a sleeve including movable dog teeth and supported on the hub through the movable dog teeth in a manner movable in an axial direction;
a rotor arranged beside the sleeve in the axial direction in a manner rotatable relative to the rotating shaft and including passive dog teeth engageable with the movable dog teeth; and
an actuator configured to move the sleeve from a neutral position where the movable dog teeth are apart from the passive dog teeth so that the rotor is rotatable relative to the rotating shaft to a gear engaging position where the movable dog teeth engage with the passive dog teeth so that the rotor is rotatable integrally with the rotating shaft to establish a predetermined speed stage,
the control method comprising:
outputting a gear engagement command of the sleeve;
controlling the actuator to move the sleeve from the neutral position to the gear engaging position when the gear engagement command is output;
determining whether an engagement of the sleeve is prevented in a course of moving the sleeve from the neutral position to the gear engaging position by the actuator; and
controlling the electric motor to rotate the rotating shaft so as to change a rotational position of the movable dog teeth relative to the passive dog teeth when it is determined that the engagement of the sleeve is prevented.

2. The method according to claim 1, further comprising detecting a moving speed of the sleeve in the axial direction,
wherein the determining includes determining that the engagement of the sleeve is prevented when the moving speed of the sleeve detected becomes equal to or slower than a predetermined value, the predetermined value being greater than 0.

3. The method according to claim 1, wherein the controlling the electric motor includes controlling the electric motor so as to change the rotational position of the movable dog teeth relative to the passive dog teeth when a condition that it is determined that the engagement of the sleeve is prevented continues for a predetermined time.

4. The method according to claim 1, wherein the controlling the actuator includes decreasing a driving force of the actuator when it is determined that the engagement of the sleeve is prevented, and
the controlling the electric motor includes controlling the electric motor so as to change the rotational position of the movable dog teeth relative to the passive dog teeth after the driving force of the actuator is decreased.

5. The method according to claim 1, further comprising detecting a rotational speed of the rotor and a rotational speed of the sleeve, wherein
the controlling the electric motor includes controlling the electric motor so that the rotational speed of the rotor detected and the rotational speed of the sleeve detected match with each other, and
the controlling the actuator includes controlling the actuator to move the sleeve from the neutral position to the gear engaging position, after the electric motor is controlled so that the rotational speed of the rotor and the rotational speed of the sleeve match.

6. A control apparatus for a transmission, the transmission comprising:
a rotating shaft rotatable by an electric motor;
a hub configured to rotate integrally with the rotating shaft;
a sleeve including movable dog teeth and supported on the hub through the movable dog teeth in a manner movable in an axial direction;
a rotor arranged beside the sleeve in the axial direction in a manner rotatable relative to the rotating shaft and including passive dog teeth engageable with the movable dog teeth; and
an actuator configured to move the sleeve from a neutral position where the movable dog teeth are apart from the passive dog teeth so that the rotor is rotatable relative to the rotating shaft to a gear engaging position where the movable dog teeth engage with the passive dog teeth so that the rotor is rotatable integrally with the rotating shaft to establish a predetermined speed stage,
the control apparatus comprising a processor and memory;
the processor configured to output a gear engagement command of the sleeve;
the processor configured to control the actuator to move the sleeve from the neutral position to the gear engaging position when the gear engagement command is output;
the processor configured to determine whether an engagement of the sleeve is prevented in a course of moving the sleeve from the neutral position to the gear engaging position by the actuator; and
the processor configured to control the electric motor to rotate the rotating shaft so as to change a rotational position of the movable dog teeth relative to the passive dog teeth when it is determined that the engagement of the sleeve is prevented.

7. The apparatus according to claim 6, wherein the processor is configured to detect a moving speed of the sleeve in the axial direction, and
wherein the processor is configured to determine that the engagement of the sleeve is prevented when the moving speed of the sleeve becomes equal to or slower than a predetermined value, the predetermined value being greater than 0.

8. The apparatus according to claim 6, wherein the processor is configured to control the electric motor so as to change the rotational position of the movable dog teeth relative to the passive dog teeth when a condition that it is determined that the engagement of the sleeve is prevented continues for a predetermined time.

9. The apparatus according to claim 6, wherein the processor is configured to decrease a driving force of the actuator when it is determined that the engagement of the sleeve is prevented, and
wherein the processor is configured to control the electric motor so as to change the rotational position of the movable dog teeth relative to the passive dog teeth after the driving force of the actuator is decreased.

10. The apparatus according to claim 6, further comprising:
a first rotational speed detector configured to detect a rotational speed of the rotor; and
a second rotational speed detector configured to detect a rotational speed of the sleeve, wherein the processor is configured to control the electric motor so that the rotational speed of the rotor detected by the first rotational speed detector and the rotational speed of the sleeve detected by the second rotational speed detector match with each other, and control the actuator to move the sleeve from the neutral position to the gear engaging position after the electric motor is controlled so that the rotational speed of the rotor and the rotational speed of the sleeve match.

11. The apparatus according to claim 6, wherein the rotor comprises a first speed drive gear, and when the movable dog teeth move to the gear engaging position, a first speed stage is established.

12. The apparatus according to claim 6, wherein the transmission further comprises:

a first clutch;

a second clutch;

a first input shaft connected to a prime mover through the first clutch;

a second input shaft arranged parallel to the first input shaft and connected to the prime mover through the second clutch; and an output shaft arranged parallel to the first input shaft so that a torque from the first input shaft or the second input shaft is transmitted to the output shaft, wherein the rotating shaft is the first input shaft or the second input shaft, a torque from the rotating shaft is transmitted to the output shaft through the rotor.

\* \* \* \* \*